United States Patent
Ptasinski et al.

(10) Patent No.: US 9,448,428 B2
(45) Date of Patent: *Sep. 20, 2016

(54) SYSTEM FOR STABILIZING THE TEMPERATURE SENSITIVITY IN PHOTONIC CIRCUITS COMPRISING THERMOELASTIC OPTICAL CIRCUIT CLADDINGS

(71) Applicant: The United States of America as represented by the Secretary of the Navy, Washington, DC (US)

(72) Inventors: Joanna N. Ptasinski, San Diego, CA (US); Sanja Zlatanovic, San Diego, CA (US)

(73) Assignee: The United States of America as represented by Secreatary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,911

(22) Filed: Jun. 5, 2015

(65) Prior Publication Data

US 2016/0011368 A1  Jan. 14, 2016

Related U.S. Application Data

(63) Continuation-in-part of application No. 14/231,367, filed on Mar. 31, 2014.

(51) Int. Cl.
*G02F 1/13* (2006.01)
*G02F 1/225* (2006.01)

(52) U.S. Cl.
CPC ............ *G02F 1/132* (2013.01); *G02F 1/2257* (2013.01); *G02F 2203/15* (2013.01); *G02F 2203/58* (2013.01)

(58) Field of Classification Search
CPC ...... G02F 1/132; G02F 1/13; G02F 2203/58; G02B 6/12; G02B 2006/12135
USPC ......................................................... 349/199
See application file for complete search history.

(56) References Cited

U.S. PATENT DOCUMENTS 5,093,025 A * 3/1992 Koide ................ C09K 19/3809
                                                              252/299.01
9,140,914 B1 * 9/2015 Ptasinski ................. G02F 1/132
(Continued)

OTHER PUBLICATIONS

J. Teng; P. Dumon; W. Bogaerts; H. Zhang; X. Jian; X. Han; M. Zhao; G. Morthier; R. Baets. Athermal Silicon-on-insulator ring resonators by overlaying a polymer cladding on narrowed waveguides. Optics Express 2009, 17(17), 14627-14633.

(Continued)

*Primary Examiner* — Paul Lee
(74) *Attorney, Agent, or Firm* — SPAWAR Systems Center Pacific; Kyle Eppele; Susanna J. Torke

(57) ABSTRACT

A system for stabilizing the temperature sensitivity in photonic circuits comprising a thermoelastic cladding directly overlaid on a photonic circuit, wherein the properties of the thermoelastic cladding are such that the temperature of the photonic circuit is passively stabilized, such as by adjustment of the effective refractive index of the photonic circuit. The thermoelastic cladding may comprise a negative thermo-optic coefficient and the photonic circuit has a positive thermo-elastic coefficient. The thermoelastic cladding may be a liquid, solid, or gas, and may be contained within a chamber having an inlet and an outlet. A pressure sensor may be contained within the chamber for monitoring pressure. The sensor can detect whether the fluid/gas has reached its maximum expansion and can send a signal when that happens. The pressure sensor is connected in a feedback loop and it sends an alarm once the chamber pressure is at a maximum.

20 Claims, 3 Drawing Sheets

(56) References Cited

U.S. PATENT DOCUMENTS

2004/0264834 A1* 12/2004 McIntyre .......... G02B 6/12007
                                                              385/14
2013/0156052 A1*  6/2013 Diehl ................... H01S 5/0612
                                                              372/20

OTHER PUBLICATIONS

Joanna Ptasinski, Sung W. Kim, Lin Pang, Iam-Choon Khoo, and Yeshaiahu Fainman; Optical tuning of silicon photonic structures with nematic liquid crystal claddings; Optics Letters/vol. 38, No. 12/Jun. 15, 2013.

S. Zlatanovic, J. Ptasinski, A Method for tuning the location of gain bands in parametric mixers. U.S. Appl. No. 14/564,824. Navy Case 102,779.

J. Ptasinski, L Pang, P.C. Sun, B. Slutsky, Y. Fainman. Plasmonic differential measurement and method for bio-chemical sensing. U.S. Appl. No. 13/195,057. Navy Case 100,978.

W. J. Tropf, M.E Thomas; Infrared refractive index and thermo-optic coefficient measurement at APL; John Hopkins APL Technical Digest, 19(3), pp. 293-298 (1998).

W.N. Ye; J. Michel; L.C. Kimerling; L. Eldada. Polymer-cladded athermal high-index-contrast waveguides. In Proceedings of the SPIE vol. 6897 (2008).

B. Guha; A. Gondarenko; and M. Lipson. Minimizing temperature sensitivity of silicon Mach-Zehnder interferometers. Optics Express 2010, 18(3), 1879-1887.

* cited by examiner

US 9,448,428 B2

SYSTEM FOR STABILIZING THE TEMPERATURE SENSITIVITY IN PHOTONIC CIRCUITS COMPRISING THERMOELASTIC OPTICAL CIRCUIT CLADDINGS

CROSS-REFERENCE TO RELATED APPLICATIONS

This application is a continuation-in-part of U.S. patent application Ser. No. 14/231,367, filed on Mar. 31, 2014, entitled "Apparatus and Method for Stabilizing the Temperature of a Photonic Circuit," the entire content of which is fully incorporated by reference herein.

FEDERALLY-SPONSORED RESEARCH AND DEVELOPMENT

The Thermoelastic Optical Circuit Claddings is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email sscpac_T2@navy.mil. Reference Navy Case Number 103060.

BACKGROUND

The silicon photonics platform, with its ability to manifest photonic devices, is promising for use in next-generation optical circuits and links. However, as the high-performance functionality of both passive and active silicon devices have continued to be demonstrated, concerns have grown over performance degradation with ambient temperature variations due to the high thermo-optic coefficient of Silicon ($\sim 1.86 \ast 10^{-4}/K$). To achieve the future vision of high bandwidth at low cost, it is necessary to develop technologies that will reduce the temperature sensitivity of silicon photonics.

Thermal stabilization of photonic devices, such as those containing silicon or other materials comprising high positive thermo-optic coefficients, has been an ongoing challenge. A common approach to the suppression of temperature sensitivity in silicon based chip-scale devices consists of using external heaters or thermoelectric coolers. However, as these approaches are active, they increase power consumption and account for the largest share in a power budget of state-of-the-art silicon photonics, in addition to demanding a large device foot-print and cost. Passive thermal stabilization techniques typically rely on the use of a negative thermo-optic coefficient (TOC) material to offset silicon's high positive TOC. Materials commonly used for passive thermal stabilization consist of polymers, such as acrylates (PSQ-LH, Polymethyl methacrylate), or Exguide™ LFR-372 (ChemOptics Inc.). A drawback to polymers, however, is that they are vulnerable to temperature degradation, chemical instability, UV aging, and poor mechanical characteristics.

Current strategies for temperature stabilization of photonic devices, such as silicon-based photonic devices, include local heating of the device itself to dynamically compensate for any temperature fluctuations, but this scheme is both cumbersome (requiring thermoelectric coolers and controllers) and power hungry. Other methods consist of using a WIR30-490 polymer overlay cladding which has negative thermo-optic coefficient, but this approach is not CMOS compatible as WIR30-490 cannot undergo any subsequent high temperature processes. Consequently, there is a growing need for compensation of the thermo-optic effect in silicon photonics.

DETAILED DESCRIPTION OF SOME EMBODIMENTS

Figure 1:
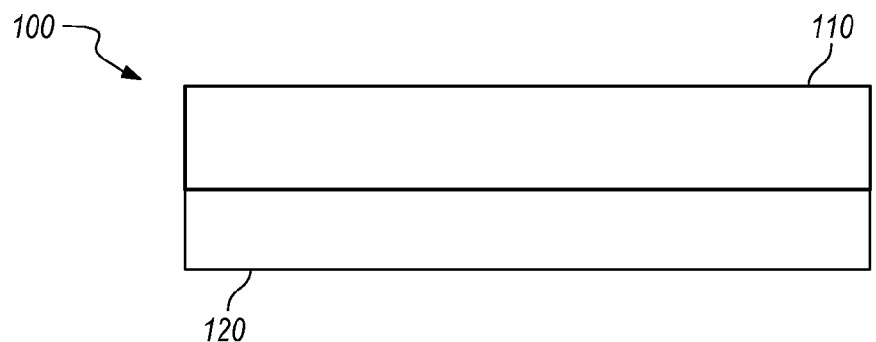
FIG. 1 shows an embodiment of a system for stabilizing the temperature sensitivity in photonic circuits.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Disclosed herein are thermoelastic claddings for the stabilization of silicon or any other similar positive TOC photonic circuits or materials. These cladding materials (i.e. jet fuel, ethyl alcohol, petroleum oil) are not traditional optical materials, but they possess optical properties having a refractive index of n=1 to n=2, an extinction coefficient of less than k=7·10$^{-5}$, and an absorption coefficient of less than α=5.700 cm.$^{-1}$ A relationship between the refractive index of a material and its thermal properties is as follows:

$$\frac{n^2-1}{n^2+2} = \frac{\rho(T)\alpha(\rho,T)}{3\cdot\varepsilon_0}$$

Where n is the refractive index, ρ is the molecular density, T is the temperature, a is the molecular polarizability, and $\epsilon_0$ is the permittivity of space. There is an inverse relationship between a material's thermal expansion coefficient and its TOC—therefore high thermal expansion materials have negative TOCs, and low thermal expansion materials have positive TOCs.

When the cladding materials are overlaid on top of the photonic circuit, the photonic circuit is passively stabilized by adjustment of the effective refractive index of the photonic circuit. The disclosed system eliminates existing power hungry and large footprint thermal stabilization techniques based on Joule heating. The disclosed thermoelastic claddings do not consume additional power (i.e. they are passive), demand a small device footprint, are readily available, are inexpensive, and are easy to incorporate in a standard photonic circuit manufacturing process.

The cladding materials disclosed herein can be used for various photonic components such as waveguides, filters, couplers, and modulating structures.

The embodiments disclosed herein are not limited to exploiting only a certain phase of a positive thermal expansion material, but may be used with gases, liquids, liquid crystal phases, and solids. An example of a solid with a positive thermal expansion coefficient and negative TOC, in addition to excellent optical properties, is crystalline quartz, which has the properties shown in Table 1:

TABLE 1

| Property | Unit | Crystalline quartz |
|---|---|---|
| Refractive Index | — | $n_O = 1.53$, $n_e = 1.54$ |
| dn/dT | $10^{-6}$ K$^{-1}$ | $-5.5$ |
| Thermal Expansion | $10^{-6}$ K$^{-1}$ | $\alpha 11 = \alpha 22 = 13.3$ |
| | | $\alpha 33 = 7.07$ |

Other materials that can be used include, polypropylene (PP), unfilled; Cellulose acetate butynate (CAB); Cellulose acetate (CA); Ethylene ethyl acrylate (EEA); Ethylene vinyl acetate (EVA); Fluoroethylene propylene (FEP); Polyethylene (PE); and Polypropylene (PP), unfilled Polyvinylidene fluoride (PVDF).

FIG. 1 shows an embodiment of a system 100 for stabilizing the temperature sensitivity in photonic circuits 120. The system 100 may comprise a thermoelastic cladding 110 directly overlaid on the photonic circuit 120. The thermoelastic cladding 110 has a negative TOC with a range of 0.0003-0.0007-dn/dT. The thermoelastic cladding further comprises a volume thermal expansion coefficient having a range of $600 \times 10^{-6}$/K-$1120 \times 10^{-6}$/K. The thermoelastic cladding further comprises a refractive index of n=1 to n=2, an extinction coefficient of less than $k=7 \times 10^{-5}$, and an absorption coefficient of less than $\alpha=5.700$ cm$^{-1}$.

Thermoelastic cladding 110 is passive and therefore consumes no additional power, but rather relies on the negative thermo-optic properties of its constituent materials. Photonic circuit 120 may comprise various shapes and sizes depending upon design requirements and application. While some embodiments of photonic circuit 120 are silicon based, photonic circuit 120 is not limited to silicon, as any other similar positive thermo-optic coefficient photonic material can be used for photonic circuit 120.

Figure 2:
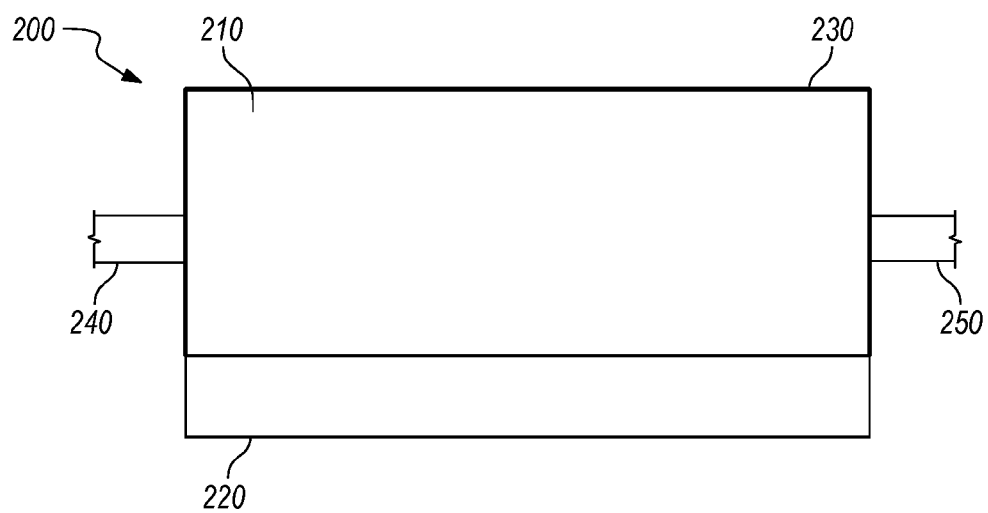
FIGS. 2-4 show a cross-section view of an embodiment of a system for stabilizing the temperature sensitivity in photonic circuits having a gas/fluidic chamber.

FIG. 2 shows an embodiment of a system 200 for stabilizing the temperature sensitivity in photonic circuits wherein thermoelastic cladding 210 is directly overlaid on photonic circuit 220, and thermoelastic cladding 210 is contained within a chamber 230 having an inlet 240 and an outlet 250. Chamber 230 may be comprised of silicon dioxide, silicon oxy-nitride, silicon nitride, diamond-like carbon, Poly-methyl methacrylate (PMMA), or SU-8 (a commonly used epoxy-based negative photoresist).

Figure 3:
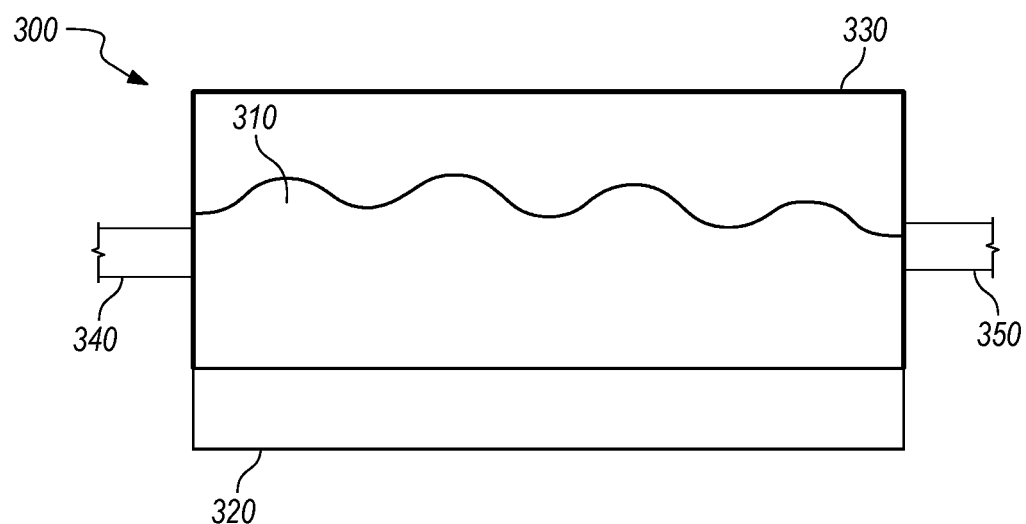

FIG. 3 shows an embodiment of a system 300 for stabilizing the temperature sensitivity in photonic circuits. In system 300, the thermoelastic cladding 310 is a liquid comprised of non-traditional optical materials having a large thermal expansion coefficient having a range of $600 \times 10^{-6}$/K-$1120 \times 10^{-6}$/K and a negative TOC with a range of 0.0003-0.0007-dn/dT. Examples of thermoelastic liquid claddings 310 include ethyl alcohol, kerosene, jet fuel, gasoline, and mercury. Liquid cladding 310 may be poured into chamber 330 to be overlaid on top of a photonic circuit 320 via the inlet 340, and, if needed, released via outlet 350.

Figure 4:
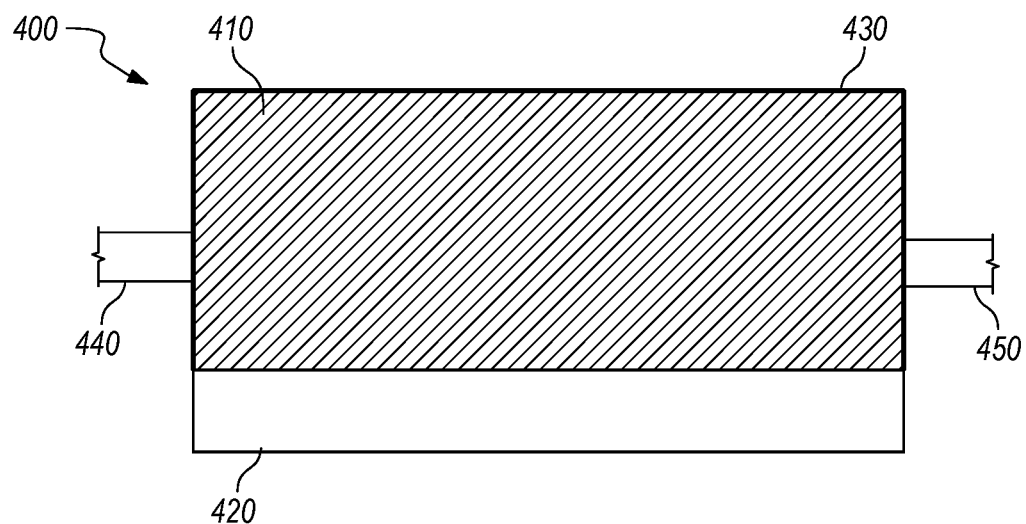

FIG. 4 shows an embodiment of a system 400 for stabilizing the temperature sensitivity in photonic circuits. In system 400, the thermoelastic cladding 410 is a gas comprising a non-traditional optical material. Examples of gas claddings include Bromine, Pentane, or Benzene. Gas cladding 410 may be infused into chamber 430 to be overlaid on top of a photonic circuit 420 via the inlet 440, and, if needed, be released the outlet 450.

Figure 5:
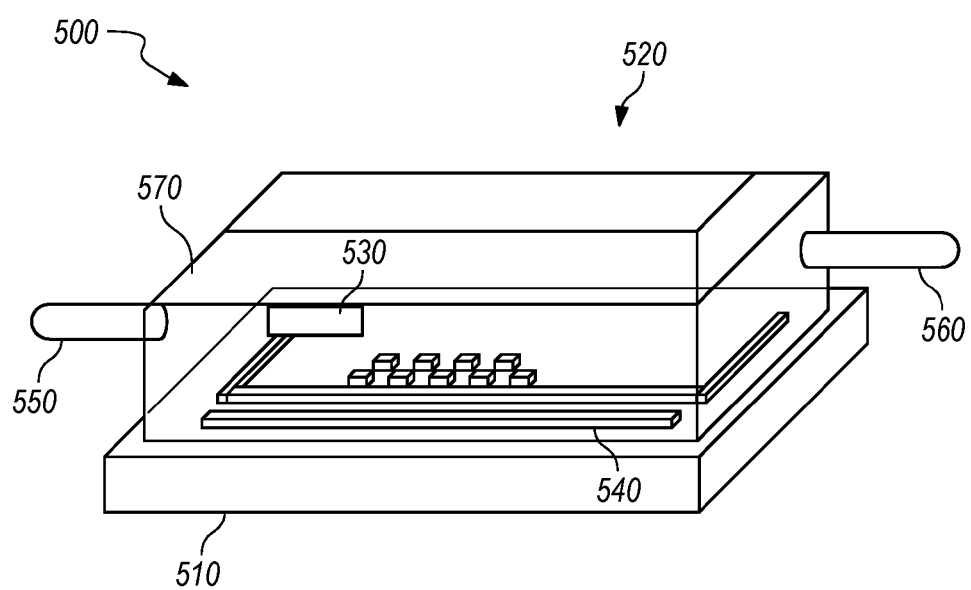
FIG. 5 shows a three-dimensional view of an embodiment of a system for stabilizing the temperature sensitivity in photonic circuits having a gas/fluidic chamber.

FIG. 5 shows a three-dimensional view of an embodiment of a system 500 for stabilizing the temperature sensitivity in photonic circuits. System 500 includes a circuit 510 having a cladding chamber 520 with a chip-scale pressure monitor 530 and chip scale devices 540. Cladding chamber 520 has an inlet 550 and an outlet 560 to allow for a thermoelastic cladding 570 having a negative TOC to be inserted into cladding chamber 520 and overlaid on top of photonic circuit 510. As an example, thermoelastic cladding 570 may be a fluid or gas as discussed herein. To prevent cladding chamber 520 from being subject to too much pressure and popping off the chip, chip-scale pressure monitor 530 can detect whether the fluid/gas has reached its maximum expansion and can send a signal when that happens. Chip-scale pressure monitor 530 can be configured to work in a feedback loop configuration.

Many modifications and variations of the Thermoelastic Optical Circuit Claddings are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system for stabilizing the temperature sensitivity in photonic circuits comprising:
    a thermoelastic cladding directly overlaid on a photonic circuit, wherein the thermoelastic cladding comprises a negative thermo-optic coefficient (TOC) and the photonic circuit comprises a positive TOC such that the temperature of the photonic circuit is passively stabilized.

2. The system of claim 1, wherein the thermoelastic cladding further comprises a volume thermal expansion coefficient having a range of $600 \times 10^{-6}$/K-$1120 \times 10^{-6}$/K and a negative TOC with a range of 0.0003-0.0007-dn/dT.

3. The system of claim 2, wherein the thermoelastic cladding further comprises a refractive index of n=1 to n=2, an extinction coefficient of less than $k=7 \times 10^{-5}$, and an absorption coefficient of less than $\alpha=5.700$ cm$^{-1}$.

4. The system of claim 3, wherein the photonic circuit is passively stabilized by adjustment of the effective refractive index of the photonic circuit.

5. The system of claim 4, wherein the thermoelastic cladding is contained within a chamber having an inlet and an outlet.

6. The system of claim 5, wherein the thermoelastic cladding is a liquid.

7. The system of claim 6, wherein the liquid is a selected one of ethyl alcohol, kerosene, jet fuel, gasoline, and mercury.

8. The system of claim 5, wherein the thermoelastic cladding is a gas.

9. The system of claim 8, wherein the gas is selected from one of Bromine, Pentane, or Benzene.

10. The system of claim 4, wherein the chamber comprises a material selected from the group of materials consisting of a selected one of silicon dioxide, silicon oxy-nitride, silicon nitride, diamond-like-carbon, Polymethyl methacrylate (PMMA), and SU-8 (a commonly used epoxy-based negative photoresist).

11. A system for stabilizing the temperature sensitivity in photonic circuits comprising:
a thermoelastic cladding directly overlaid on a photonic circuit, wherein the thermoelastic cladding has a thermal expansion coefficient ranging from $600 \times 10^{-6}$/K-$1120 \times 10^{-6}$/K and a negative TOC with a range of 0.0003-0.0007-dn/dT, a refractive index of n=1 to n=2, an extinction coefficient of less than $k=7\text{-}10^{-5}$, and an absorption coefficient of less than $\alpha=5.700$ cm$^{-1}$, wherein the thermoelastic cladding passively stabilizes the photonic circuit by adjustment of the effective refractive index of the photonic circuit.

12. The system of claim 11, wherein the thermoelastic cladding is contained within a chamber having an inlet and an outlet.

13. The system of claim 12, wherein the chamber comprises a material selected from the group of materials consisting of a selected one of silicon dioxide, silicon oxy-nitride, silicon nitride, diamond-like-carbon, Polymethyl methacrylate (PMMA), and SU-8 (a commonly used epoxy-based negative photoresist).

14. The system of claim 13, wherein the thermoelastic cladding comprises a liquid.

15. The system of claim 14, wherein the liquid is selected from the group consisting of ethyl alcohol, kerosene, jet fuel, gasoline, and mercury.

16. The system of claim 13, wherein the thermoelastic cladding is a gas.

17. The system of claim 16, wherein the gas is selected from the group consisting of Bromine, Pentane, and Benzene.

18. A temperature-stabilized photonic circuit comprising:
a photonic circuit;
a thermo-elastic cladding disposed directly over the photonic circuit, wherein the thermo-elastic layer has a negative TOC and the thermo-elastic cladding passively stabilizes the temperature of the photonic circuit through adjustment of the effective refractive index of the photonic circuit,
and a chamber having an inlet and outlet enclosing the thermoelastic cladding.

19. The circuit of claim 18, wherein the thermo-elastic cladding comprises a material with a thermal expansion coefficient range of $600 \times 10^{-6}$/K-$1120 \times 10^{-6}$/K and a negative TOC with a range of 0.0003-0.0007-dn/dT.

20. The circuit of claim 19, further comprising a pressure monitor in a feedback loop configuration contained within the chamber.

* * * * *